(12) United States Patent
Micucci et al.

(10) Patent No.: US 12,110,797 B1
(45) Date of Patent: Oct. 8, 2024

(54) BLADE OUTER AIR SEAL WITH SEAL PLATE AND FLEXIBLE SEAL

(71) Applicant: RTX CORPORATION, Farmington, CT (US)

(72) Inventors: Joseph Micucci, Scarborough, ME (US); Mikayla M. Rogers, Portland, ME (US); Daniel S. Rogers, Lyman, ME (US); Danielle Mahoney, Granby, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/428,450

(22) Filed: Jan. 31, 2024

(51) Int. Cl.
*F01D 11/08* (2006.01)

(52) U.S. Cl.
CPC .......... *F01D 11/08* (2013.01); *F05D 2240/11* (2013.01); *F05D 2240/55* (2013.01); *F05D 2250/75* (2013.01); *F05D 2300/6033* (2013.01); *F05D 2300/611* (2013.01)

(58) Field of Classification Search
CPC .. F01D 11/08; F05D 2240/11; F05D 2240/55; F05D 2250/75; F05D 2300/6033; F05D 2300/611
See application file for complete search history.

(56) References Cited

U.S. PATENT DOCUMENTS

| | | | |
|---|---|---|---|
| 9,845,697 B2* | 12/2017 | Davis | F16J 15/0887 |
| 9,874,104 B2* | 1/2018 | Shapiro | F01D 11/08 |
| 11,041,399 B2* | 6/2021 | Lutjen | F01D 5/14 |
| 11,143,050 B2* | 10/2021 | Roy Thill | F01D 11/08 |
| 11,346,252 B2* | 5/2022 | Giannakopoulos | F01D 9/02 |
| 11,466,585 B2* | 10/2022 | Arbona | F01D 25/246 |
| 2018/0156069 A1* | 6/2018 | Quennehen | F01D 11/08 |
| 2021/0131300 A1* | 5/2021 | Arbona | F01D 25/246 |
| 2021/0254503 A1* | 8/2021 | Roy | F01D 25/12 |

* cited by examiner

*Primary Examiner* — Eldon T Brockman
(74) *Attorney, Agent, or Firm* — Carlson, Gaskey & Olds, P.C.

(57) ABSTRACT

A gas turbine engine includes a row of blade outer air seal (BOAS) arc segments arranged around an engine axis. Each of the BOAS arc segments includes a ceramic matrix composite (CMC) body that has forward and aft flanges that project from the non-core gaspath side. An annular seal plate is located forward of the forward flange and includes a radially-extending wall, an axially-extending wall that projects forwardly from the radially-extending wall, and a nose that projects aftly from the radially-extending wall. The nose seals against the forward flange. A flexible seal is located in a recess defined by the radially-extending wall and the axially-extending wall. The flexible seal seals against a forward face of the radially-extending wall and is radially spaced apart from a radially outer face of the axially-extending wall.

11 Claims, 2 Drawing Sheets

BLADE OUTER AIR SEAL WITH SEAL PLATE AND FLEXIBLE SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Components in the turbine section are typically formed of a superalloy and may include thermal barrier coatings to extend temperature capability and lifetime. Ceramic matrix composite ("CMC") materials are also being considered for such components. Among other attractive properties, CMCs have high temperature resistance. Despite this attribute, however, there are unique challenges to implementing CMCs.

SUMMARY

A gas turbine engine according to an example of the present disclosure includes a row of blade outer air seal arc segments arranged around an engine axis. Each of the blade outer air seal arc segments include a ceramic matrix composite (CMC) body defining a core gaspath side, a non-core gaspath side opposite the core gaspath side, a forward end, an aft end, and circumferential sides. The CMC body has forward and aft flanges that project from the non-core gaspath side. An annular seal plate is located forward of the forward flange. The annular seal plate includes a radially-extending wall, an axially-extending wall that projects forwardly from the radially-extending wall, and a nose that projects aftly from the radially-extending wall. The nose seals against the forward flange. A flexible seal is located in a recess defined by the radially-extending wall and the axially-extending wall. The flexible seal seals against a forward face of the radially-extending wall and the flexible seal is radially spaced apart from a radially outer face of the axially-extending wall.

In a further embodiment of any of the foregoing embodiments, the flexible seal is a W-seal.

In a further embodiment of any of the foregoing embodiments, a tip of the nose is radially inwardly offset from the W-seal.

In a further embodiment of any of the foregoing embodiments, the W-seal includes two convolutes.

In a further embodiment of any of the foregoing embodiments, the nose includes a notch that opens radially-inwardly.

In a further embodiment of any of the foregoing embodiments, at least the forward flange includes a forward face that has a forward flange multi-layered coating against which the nose seals.

In a further embodiment of any of the foregoing embodiments, the multi-layered coating includes a bond layer of silicon and a topcoat of mullite.

In a further embodiment of any of the foregoing embodiments, the aft flange includes an aft face that has an aft flange multi-layered coating that includes a bond layer of silicon and a topcoat of mullite.

A further embodiment of any of the foregoing embodiments includes a case located aft of the aft flange, the case including a nose that seals against the aft flange multi-layered coating.

In a further embodiment of any of the foregoing embodiments, the forward flange multi-layered coating and the aft flange multi-layered coating include machined surfaces that define a controlled axial length dimension there between.

In a further embodiment of any of the foregoing embodiments, the seal plate is formed of a metallic alloy, and the forward flange multi-layered coating is interposed between the nose and the CMC body.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
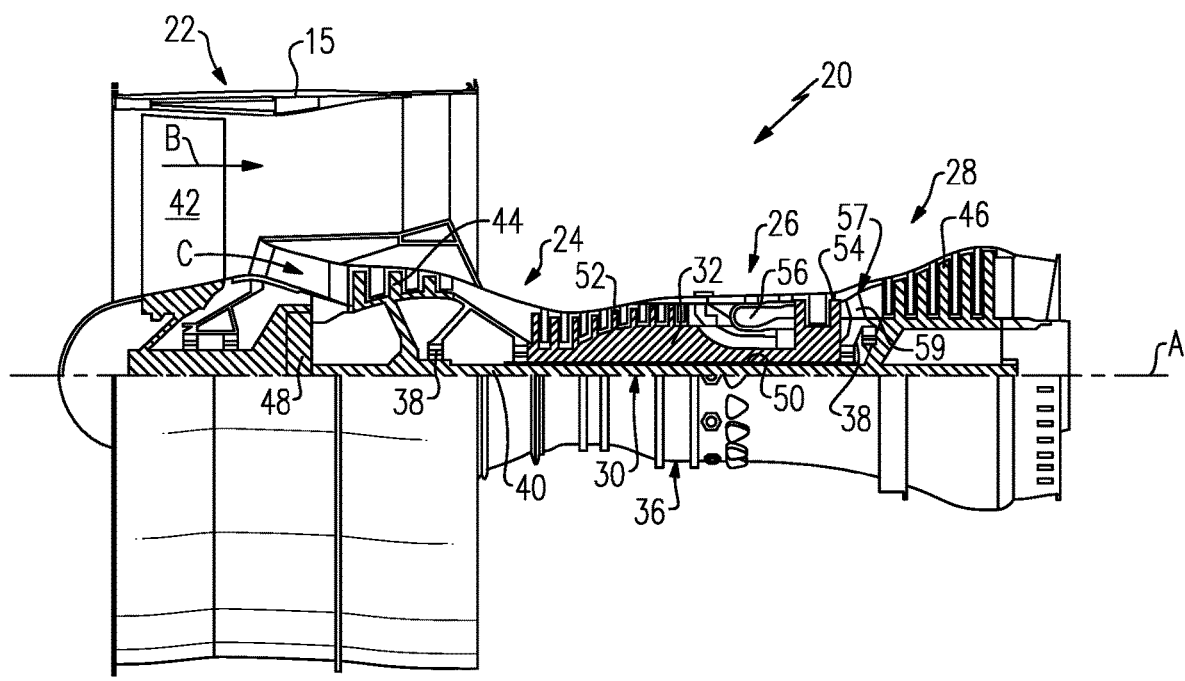
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
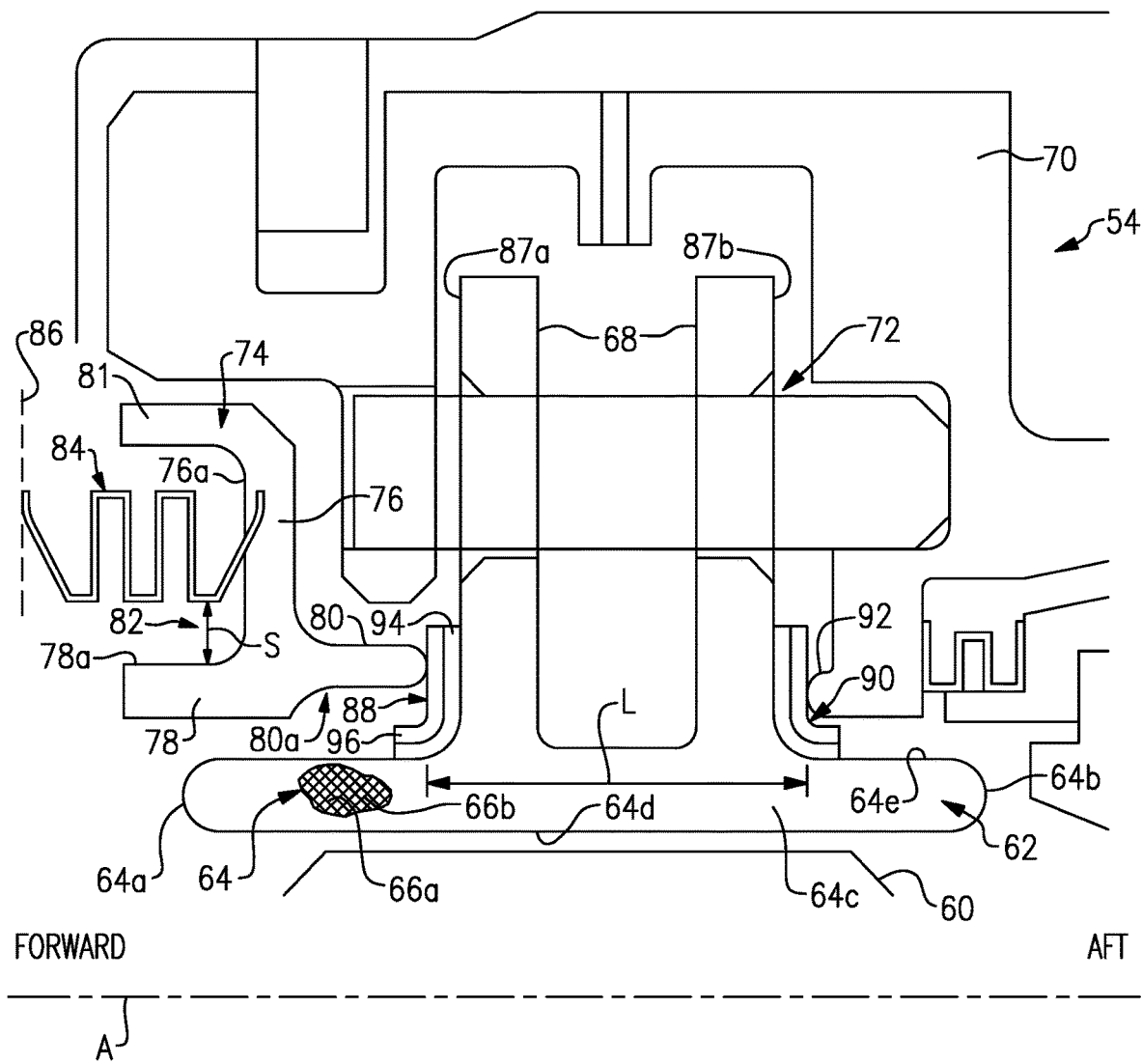
FIG. 2 illustrates a portion of a turbine section of the engine, including a blade outer air seal.

FIG. 2 illustrates a portion of the high pressure turbine 54. The turbine 54 includes a row of rotatable blades 60 that is axially between a forward row of vanes (not shown) and an aft row of vanes (not shown). A row of blade outer air seal (BOAS) arc segments 66 is located radially outwards of the blades 60. The BOAS 66 are arc segments in that they each are arced about the engine central axis A.

Each BOAS arc segment 62 is comprised of a ceramic matrix composite body 64 (see cutaway "CMC body 64"). A CMC material is comprised of ceramic fiber plies 66a in a ceramic matrix 66b. Example ceramic matrices are silicon-containing ceramic, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC body 64 may be, but is not limited to, a SiC/SiC ceramic matrix composite in which SiC fiber plies are disposed within a SiC matrix.

The CMC body 64 defines a forward end 64a, an aft end 64b, circumferential sides 64c, a core gaspath side 64d facing the row of blades 60, and a non-core gaspath side 64e opposite the core gaspath side 68d. Though not shown, the circumferential sides 64c are provided with grooves a feather seals that are held in the grooves to the gaps from one BOAS arc segment 62 to the next. There is a pair of flanges 68 that project radially from the non-core gaspath side 64c. The flanges 68 are not limited to, but may serve for, mounting the BOAS arc segment 62 to a case 70 or other static structure in the engine 20, such as in a pinned clevis joint 72, or alternatively a hook-type attachment.

The feather seals and other sealing in the turbine section 54 serve to reduce flow of hot gases from the core gaspath into regions behind the BOAS arc segments 62. In this regard, in the illustrated example, the turbine section 54 includes an annular seal plate 74 that is located forward of the forward one of the flanges 68. For example, the seal plate 74 is a full hoop structure around the axis A that provides axial sealing along the forward portion of the BOAS arc segments 62. The seal plate 74 is formed of a metallic alloy (e.g., a nickel- or cobalt-based superalloy) and includes a radially-extending wall 76, an axially-extending 78 wall that projects forwardly from the radially-extending wall 76, and a nose 80 that projects aftly from the radially-extending wall 76. In the illustrated example, the seal plate 74 additionally includes another axially-extending wall 81 that projects axially forwardly from the radially outer end of the radially-extending wall 76. The nose 80 seals against the forward one of the flanges 68, thus blocking flow of gases along the forward one of the flanges 68.

The walls 76/78 of the seal plate 74 define a recess 82 there between. There is a flexible seal 84 located in the recess 82. In the illustrated example, the flexible seal 84 is a W-seal, which has multiple convolutes. For example, the W-seal as shown has two convolutes, for a desirable combination of sealing and flexibility in the engine 20. The flexible seal 84 is axially compressed between the radially-extending wall 76 and a structure 86, which may be a portion of the case 70 or a portion of the adjacent vanes. The flexible seal 84 seals against the structure 86 and a forward face 76a of the radially-extending wall 76, thus blocking flow to regions behind the BOAS arc segments 62 and adjacent vanes. The flexible seal 84 also serves to axially bias the seal plate 74 in an aft direction towards the forward one of the flanges 68 in order to provide continuous positive contact force between the nose 80 and the forward one of the flanges 68.

The flexible seal 84 is radially spaced apart, as designated at "S," from a radially outer face 78a of the axially-extending wall 78. The region around the flexible seal 84 is subject to high engine temperatures, as well as temperature fluctuations across flight cycles. The components, including the flexible seal 84, are subject to thermal growth and thermal shrinkage with such temperature fluctuations. In this regard, the spacing S serves to provide a margin to accommodate thermal growth and thermal shrinkage without the flexible seal 84 interfering with the axially-extending wall 78 over thermal cycling, which could otherwise lead to undesired induced stresses on the flexible seal 84 and/or surrounding components.

The flexible seal 84 and seal plate 74 also provide for sealing within a compact region of the turbine section 54. In particular, design space for sealing systems is limited in the region forward of the flanges 68. In this regard, the tip of the nose 80 is radially inwardly offset from the flexible seal 84. Such an offset serves to displace the biasing force of the flexible seal 84 from the sealing location at the nose 80. Thus, the biasing force need not be directly adjacent the nose 80 and can instead be located in an outer portion of the region where there is more design space available, while the nose 80 can be made compact to fit with ample clearance in the inner portion of the region. For instance, the nose 80 includes a notch 80a that opens radially-inwardly. The notch 80a provides clearance between the nose 80 and neighboring components, such as a coating 88 on the flange 68, which will be discussed in further detail below.

As also illustrated in FIG. 2, a forward face 87a of the forward one of the flanges 68 includes a first (forward flange) multi-layered coating 88, and an aft face 87b of the aft one of the flanges 68 includes a second (aft flange) multi-layered coating 90. The nose 80 of the seal plate 74 is in contact with and seals against the coating 88, and a nose 92 of the case 70 contacts and seals against the coating 90 such that the fore and aft regions of the BOAS arc segments 62 are sealed. The coatings 88/90 are thus interposed axially between, respectively, the nose 80 and the CMC body 64 of the forward flange 68 and the nose 92 and the CMC body 64 of the aft flange 68. The coatings 88/90 serve as a barrier between the metallic alloy(s) from which the seal plate 74 and case 70 are formed of and the elements of the CMC material of the BOAS arc segment 62, facilitating prevention of chemical interactions that can occur between those elements. The coatings 88/90 also serve to provide a smooth surface for sealing against, as the bare surface of the CMC is often uneven from undulations across the fiber bundles near the surface.

Each of the coatings 88/90 includes a bond layer 94 of silicon, such as pure or substantially pure elemental silicon, and a topcoat layer 96 of mullite (e.g., $3Al_2O_3 2SiO_2$ or $2Al_2O_3 SiO_2$). The silicon bond layer 94 provides good bonding with the underlying CMC material, while the mullite topcoat layer 96 provides good barrier and thermal properties. As an example, the layers 94/96 are deposited in respective air plasma spray processes. Additionally, the exposed faces of the coatings 88/90 are machined surfaces that define a controlled axial length dimension there between (designated at "L"). For instance, variations in the manufacturing of the CMC body 64 can cause a range of dimensional variations in the BOAS arc segment 62, particularly in geometry of the flanges 68, which may affect the axial position of the BOAS arc segment 62. If the BOAS arc segment 62 is positioned too far forward or aft it can interfere with neighboring components. In this regard, the coatings 88/90 are used to accommodate such variations, and thus ensure proper positioning of the BOAS arc segment 62.

As an example, the BOAS arc segment 62 is measured prior to application of the coatings 88/90 to determine thicknesses of the coatings 88/90 that provide a desired positioning, i.e., a desirable axial length dimension L. The coatings 88/90 are applied in thicknesses in excess of what the final thicknesses are to be. The applied coatings 88/90 are then machined to thicknesses that yield the desired axial length dimension L. For instance, the coating 88 is machined first and the machined surface of the coating 88 is then used as a datum surface to precisely machine the coating 90 (or vice versa). In this manner, even if the geometry of the CMC and flanges 68 varies outside of a desired tolerance, the thicknesses of the coatings 88/90 is selected to accommodate the variation and thus still ensure a proper positioning of the BOAS arc segment 62. Additionally, providing a greater thickness of the coatings 88/90 ensures that the machining of the coatings 88/90 does not pierce through to the underlying CMC and damage the CMC fibers.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
a row of blade outer air seal arc segments arranged around an engine axis, each of the blade outer air seal arc segments including a ceramic matrix composite (CMC) body defining a core gaspath side, a non-core gaspath side opposite the core gaspath side, a forward end, an aft end, and circumferential sides, the CMC body having forward and aft flanges projecting from the non-core gaspath side;
an annular seal plate located forward of the forward flange, the annular seal plate including a radially-extending wall, an axially-extending wall projecting forwardly from the radially-extending wall, and a nose projecting aftly from the radially-extending wall, the nose sealing against the forward flange; and
a flexible seal located in a recess defined by the radially-extending wall and the axially-extending wall, the flexible seal sealing against a forward face of the radially-extending wall and the flexible seal being radially spaced apart from a radially outer face of the axially-extending wall.

2. The gas turbine engine as recited in claim 1, wherein the flexible seal is a W-seal.

3. The gas turbine engine as recited in claim 2, wherein a tip of the nose is radially inwardly offset from the W-seal.

4. The gas turbine engine as recited in claim 3, wherein the W-seal includes two convolutes.

5. The gas turbine engine as recited in claim 1, wherein the nose includes a notch that opens radially-inwardly.

6. The gas turbine engine as recited in claim 1, wherein at least the forward flange includes a forward face that has a forward flange multi-layered coating against which the nose seals.

7. The gas turbine engine as recited in claim 6, wherein the multi-layered coating includes a bond layer of silicon and a topcoat of mullite.

8. The gas turbine engine as recited in claim 6, wherein the aft flange includes an aft face that has an aft flange multi-layered coating that includes a bond layer of silicon and a topcoat of mullite.

9. The gas turbine engine as recited in claim 8, further comprising a case located aft of the aft flange, the case including a nose that seals against the aft flange multi-layered coating.

10. The gas turbine engine as recited in claim 9, wherein the forward flange multi-layered coating and the aft flange multi-layered coating include machined surfaces that define a controlled axial length dimension there between.

11. The gas turbine engine as recited in claim 6, wherein the seal plate is formed of a metallic alloy, and the forward flange multi-layered coating is interposed between the nose and the CMC body.

* * * * *